Sept. 23, 1969     T. A. ZECHIN     3,469,073
ELECTRICAL SYSTEM
Filed June 22, 1964     2 Sheets-Sheet 1
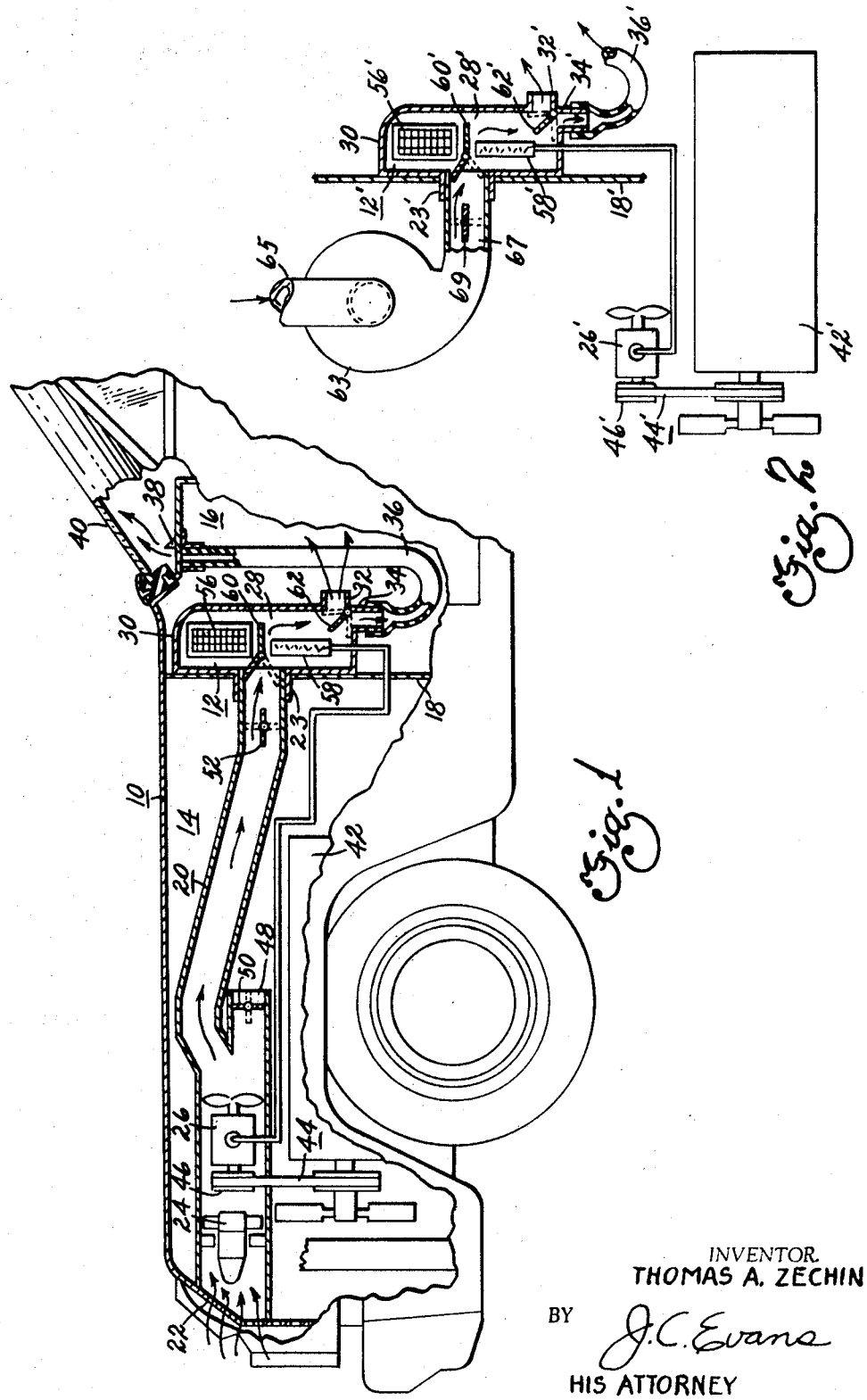
INVENTOR.
THOMAS A. ZECHIN
BY J.C. Evans
HIS ATTORNEY

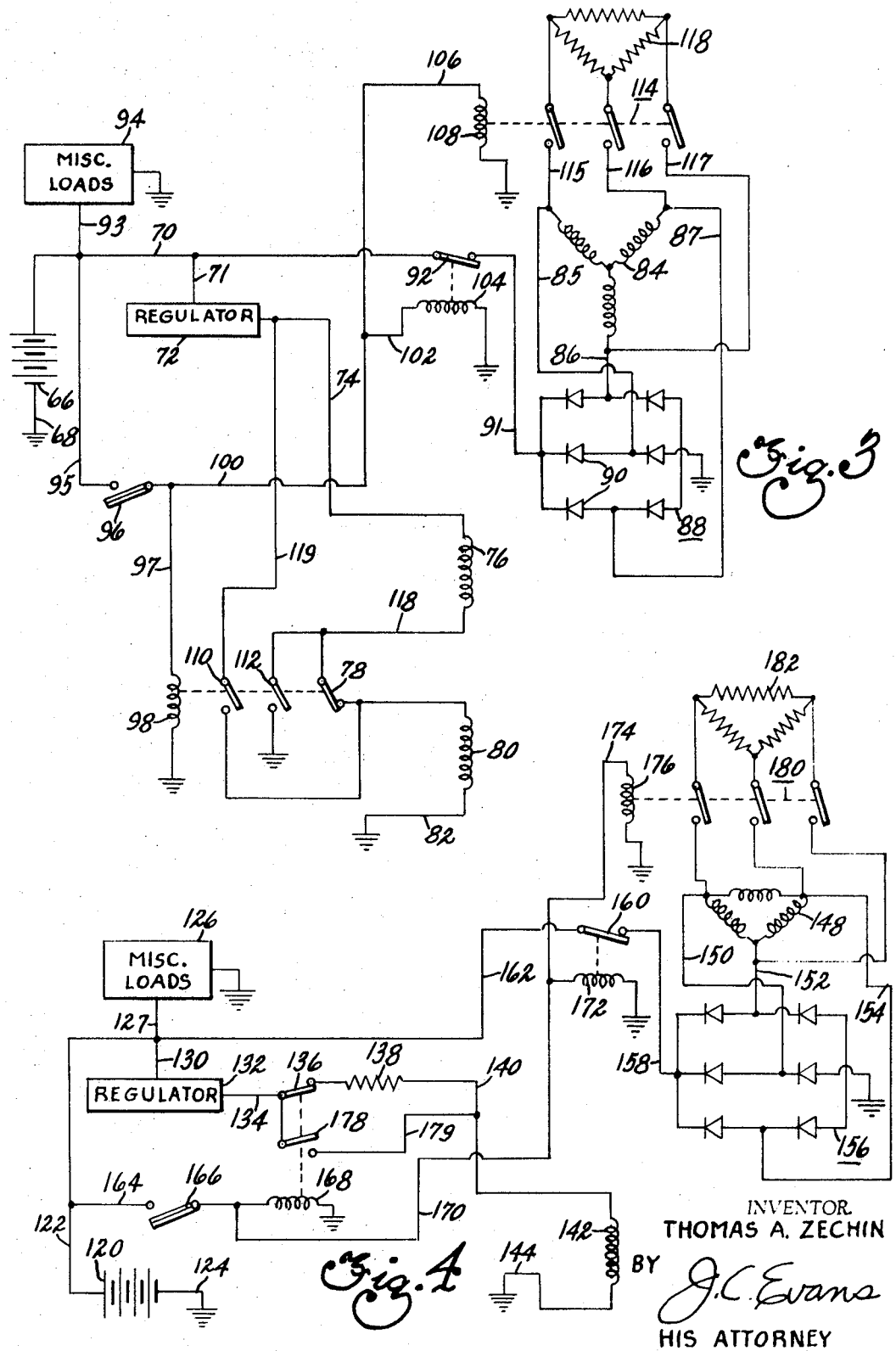

United States Patent Office 3,469,073
Patented Sept. 23, 1969

3,469,073
ELECTRICAL SYSTEM
Thomas A. Zechin, St. Clair Shores, Mich., assignor to General Motors Corporation, Detroit, Mich., a corporation of Delaware
Filed June 22, 1964, Ser. No. 376,850
Int. Cl. F27d 11/00
U.S. Cl. 219—279                          5 Claims

ABSTRACT OF THE DISCLOSURE

In preferred form, an automotive heating system including an alternator, means for varying the field energization of the alternator to control its output without affecting the operation or circuitry of the regulator, and thermally responsive means sensing the water temperature in a water-circulation primary heating system and including means to disconnect the alternator output from conventional DC automotive load circuits during the transient warm-up period when the alternator output is supplied to an electric heater.

---

This invention relates to an automobile power supply system and more particularly to a power system including an auxiliary electrical heating system. The auxiliary electrical heating system is operative during the period extending from engine start-up to when the engine is at normal operating temperature. During this transient period an alternator is made to produce a higher voltage output than in its normal operation thus providing much greater heating capacity from the auxiliary resistance heater. The greater voltage output is provided for by inexpensive means not involving alteration of the regular circuitry. Also during the transient period, the DC load of the vehicle is provided by the battery.

One problem in the present-day automobiles having a conventional hot water heating system occurs under low ambient temperature operating conditions. In such cases, the fluid used in the heating system is initially at a relatively low temperature and a substantially delay occurs following engine start-up before the fluid temperature increases sufficiently to produce a comfortable output temperature from the system. Where the vehicle is used only for short trips the passenger compartment temperature might never reach a comfortable range because of the delay.

Accordingly, an object of the present inveniton is to supplement the heating action of a primary automotive heating system by the provision of an auxiliary electrical heating system operable during a transient warm-up period of the primary heater system to produce a high B.t.u. input into the passenger compartment of the vehicle.

A further object of the present invention is to improve auxiliary electrical heating systems for an automotive vehicle or the like by the provision of a generator control system operable to produce a plurality of voltage outputs, one of which serves to energize an electrical resistance element to effect a transient heating of passenger compartment and/or a transient window defrosting.

A still further object of the present invention is to improve an automobile heating and defrosting system by the provision of a generator control system operable to produce first and second voltage outputs and including circuit means for supplying one of the voltage outputs as a regulated source of DC to a DC load circuit and for supplying the other of the outputs to an electrical resistance element without affecting the DC load circuit.

A still further object of the present invention is to provide an improved, economical auxiliary electrical heating system for passenger compartment warm-up or window defrosting including a generator electrically connected in an automotive electrical circuit that includes control circuit means for producing first and second generator voltage outputs with said control circuit means supplying a regulated DC supply to certain load circuits during one voltage output and an AC supply to other load circuits during another voltage output.

Yet another object of the present invention is to provide an improved electrical power system for an automobile including a battery, regulator, generator and control circuit means for effecting a high and low voltage output from said generator, said control circuit means operable in conjunction with the regulator during low voltage output to produce a constant DC output.

Further objects and advantages of the present invention will be apparent from the following description, reference being had to the accompanying drawings wherein preferred embodiments of the present invention are clearly shown.

In the drawings:

FIGURE 1 is a fragmentary view in side elevation partially broken away and partially in section of a motor vehicle including the present invention.

FIGURE 2 is a diagrammatic view of a modified heater system including the invention;

FIGURE 3 is a diagrammatic view of one embodiment of an electrical power system including the present invention; and FIGURE 4 is an diagrammatic view of another embodiment of an electrical power supply including the invention.

Referring now to FIGURE 1 of the drawings, a motor vehicle 10 is illustrated including a heating system 12 supported within the engine compartment 14 which is separated from a passenger compartment 16 by a fire wall 18. The heating system 12 more particularly comprises an elongated duct 20 extending through the compartment 14 so that a forwardly located open end thereof communicates through a grillwork 22 with the outside air and an opposite open end thereof is supported within an inlet fitting 23 directed through the fire wall 18. Within the duct 20 adjacent the inlet end thereof is located an axial flow, motor driven air pump 24 for drawing air through grillwork 22 and directing it across an alternator 26 located within duct 20 downstream of pump 24. The pump air then passes through the outlet of duct 20 and inlet fitting 23 into a plenum 28 formed by a heater unit enclosure 30 having an outlet fitting 32 thereon communicating directly with the passenger compartment 16 and an outlet fitting 34 connected by a flexible conduit 36 to a defroster opening 38 for directing heated air across a windshield 40 for removing frozen moisture therefrom.

In the embodiment illustrated in FIGURE 1, the generator 26 is driven by the vehicle engine 42 through a belt pulley system 44 that includes a driven pulley 46 operatively connected to the geneartor 26. The duct 20 rearwardly of the alternator 26 includes a by-pass portion 48 under the control of a spill butterfly valve 50 which is normally open when the heating system is not in use. When valve 50 is moved to a closed position a butterfly valve 52 in the duct portion 20 adjacent inlet fitting 23 is conjointly adjustably opened to allow air to flow through an adjustable flap valve assembly 60 into the heating unit enclosure where a hot water core 56 is located that is connected to the cooling system of the vehicle whereby heated fluid circulates therethrough. The core 56 heats circulated air to warm compartment 16. Additionally, an electrical heating unit 58 is located within plenum 28 where it is separated from core 56 by the flap valve assembly 60 that is operable to direct air flow from the duct 20 across either or both of the heating units to a greater or lesser degree for obtaining a modulated air heating effect therefrom. Additionally, a flapper valve assembly 62 is arranged with respect to the plenum outlet fittings 32, 34 for regulating air flow quantities passing into the passenger compartment 16 and passing out the defrost opening 38 depending upon the desires of a particular user.

By virtue of the above-described arrangement, an optimum heat recovery is obtained since outside air passing through the duct 20 will pick up heat from the pump 24 and generator 26. Additionally, this air flow serves to cool the pump and generator accessories during their operation. Because of the arrangement, ram air supplements the air pumping capacity of the axial flow pump 24 during heater operation and supplements the cooling action of the fan portion of the alternator 26 when the heater is not in use. Furthermore, because of the fact that the alternator 26 is supported within the duct 20 downstream of the pump 24, sufficient pressure is produced at the belt slot in duct 20 to insure against the drawing of underhood fumes into the passenger compartment 26 during heater operation.

While the illustrated arrangement of heating units 56, 58 within the plenum 28 includes a parallel relationship of the heating elements, it will be understood by those skilled in the art that these units may in some instances be arranged serially within the inlet ductwork to the passenger compartment of a vehicle where such a modification would simplify the ducting and installation of the heater assembly in the vehicle.

Another arrangement of a heating system including the present invention is illustrated in FIGURE 2. This system includes a centrifugal blower 63 having an inlet 65 adapted to be communicated with a fresh air intake and an outlet 67 including an air flow regulating butterfly valve 69 therein. The embodiment otherwise includes components like those in FIGURE 1 with like components in this embodiment being designated by like numerals that are primed.

In the illustrated arrangements, the electrical heating units 58, 58' are selectively energizable by means of control systems of the type illustrated in FIGURES 3 and 4 to produce supplemental or auxiliary heating effects in addition to those produced by the cores 56, 56' of the hot water heater systems. Such an auxiliary heating effect serves to produce a B.t.u. input to the passenger compartment sufficient to warm it during the time it takes to produce a high temperature input from air circulating over the hot water core. For purposes of this specification, the delay in heating the hot water system by the engine will be referred to as a transient warm-up period.

One problem with auxiliary electrical heating arrangements is that the electrical power output from present-day automobile power systems is typically limited to a regulated voltage usually in the range of 12 volts. Such a limited output voltage would require a very high current to supply an adequate electrically produced B.t.u. input for warming the passenger compartment to a comfortable point during the transient warm-up period.

Therefore, in accordance with one of the principles of the present invention, the electrical resistance heater is associated with a generator system including means for producing a B.t.u. output at higher voltage from the electrical heater adequate to comfortably warm the compartment 16 through the transient warm-up period and including means for supplying a regulated limited voltage during other periods.

More particularly, with reference to FIGURE 3 an arrangement is illustrated for producing such an increased B.t.u. output including a battery or source of DC current 66 electrically connected in a generator system by a conductor 68 to ground and conductors 70, 71 to a regulator 72 having an output therefrom to a generator field circuit including a lead 74, a first generator field coil 76, a series link switch 78, a second generator coil 80 and a lead 82 to ground. The regulator 72 controls the energizing current through the field circuit 74 to produce a predetermined voltage output from a three-phase Y-connected alternator armature 84 having output leads 85, 86, 87 therefrom electrically connected through a rectifying circuit 88 having suitably arranged diodes or the like 90 to direct current flow from the output circuit of the armature 84 as a controlled DC supply through a lead 91, a normally closed relay cutoff switch 92, conductor 70, a lead 93 and miscellaneous DC load circuits 94 and thence to ground. Furthermore, the circuit of FIGURE 3 includes a control switch circuit having a first branch comprising a conductor 95 electrically connected to the conductor 70, a thermally responsive switch 96, a conductor 97, a field relay coil 98 to ground; another branch from switch 96 including a lead 100, a lead 102, a DC relay coil 104 to ground; and still another branch from lead 100 including a lead 106 and a heater relay coil 108 to ground. In the illustrated arrangement, the thermally responsive switch 96 is arranged in intimate heat transfer contact with the fluid in the hot water heating system and when its temperature is below a predetermined value which is attained at the end of a particular transient warm-up period, the switch is closed so as to energize the switching circuit to effect a high voltage output from the armature 84 of the alternator. More particularly, when the switch 96 is closed the field relay coil 98 closes control switches 110, 112 to arrange the field coils 76 and 80 in parallel and to open switch 78 to disconnect the serial link between coils 76 and 80. Concurrently, the direct current relay switch 92 is opened and the heater relay coil 108 closes a ganged triple switch 114 in leads 115, 116 and 117 from armature 84. Once the coils 76, 80 are arranged in parallel, a field energization circuit is effected including one branch from regulator 72 through lead 74, coil 76, a lead 118 including closed switch 112 to ground and another branch from regulator 72 through a lead 119 including closed switch 110, coil 80 and lead 82 to ground. When the switching circuit is so energized, the field current is supplied by the battery 66. By virtue of this arrangement the output voltage of the generator is doubled during the transient warm-up period. Since such an output voltage would be above the normal rating for the miscellaneous load circuits 94 and the components of the rectifying bridge 88, it is necessary to open the switch 92. During the transient period current for the load circuits 94 is supplied from battery 66 and the high voltage output from the armature 84 is connected by the switch 114 to a delta-connected AC load 118 for producing the heat output from heater 58.

Once a predetermined desired water temperature is present in the hot water heating system, the switch 96 opens to deenergize the switching circuit whereby the series field switch 78 is closed and the switches 110 and 112 are opened to electrically connect the coils 76, 80 in series to reduce the voltage output from the armature 84. Concurrently, the direct relay switch 92 is closed so as to connect the rectifier circuit 88 with the miscellaneous loads and the switch 114 is opened to disconnect the AC load from the generator output. During this operation, the regulator 72 serves to produce a constant regulated voltage to the miscellaneous DC load circuit 94 by controlling the energization of field coils 76, 80 in a manner well known to those skilled in the art.

By virtue of the above-illustrated control circuit, the electrical heater element 58 is supplied with an adequate source of power to increase the air temperature into the passenger compartment 16 sufficiently to make the compartment comfortable during the transient warm-up period. The generator is cooled during its high voltage output phase of operation by the lower temperature ambient so that the overload thereon will not become critical during short transient warm-up periods.

Now with reference to FIGURE 4, another electrical system is illustrated including a battery 120 serving as a source of DC voltage having the output terminal connected to a lead 122 and othe other terminal thereof connected to ground through a lead 124. When the ignition circuit of an automobile is cosed, the battery 120 serves as a source of power for typical DC load circuits 126 being connected thereto through lead 122, and lead 127. The circuit also includes a generator field energization circuit including lead 122, a lead 130, a regulator 132, a lead 134, a normally closed relay switch 136, a resistor 138, a lead 140, a generator field coil 142, and thence through lead 144 to ground. Energization of the coil 142 produces a predetermined voltage output from what is representatively illustrated as a delta-connected alternator armature 148 having an output circuit therefrom including leads 150, 152 and 154 connected across a DC rectifying bridge 156 to a lead 158 having a closed relay switch 160 therein for controlling current flow from the rectifier circuit 156 through a lead 162 and lead 127 to the miscellaneous load circuits 126. In the above-described arrangement, the regulator 132 will sense the output voltage from armature 148 to vary the field energization current so as to effect a constant voltage to the load circuits 126.

In the arrangement illustrated in FIGURE 4, a control switch circuit somewhat like that of FIGURE 3 is provided including a lead 164 for electrically connecting a thermally responsive switch 166 through a field relay coil 168 to ground. The control switch circuit includes another branch defined by a lead 170 from switch 166 for completing an energization circuit through a DC relay coil 172 to ground. The lead 170 also is electrically connected to a conductor 174 that completes an energization circuit through a heater relay coil 176 to ground.

In this embodiment of the invention, a high output voltage is produced from the armature 148 when the thermally responsive switch 166 is closed. When this happens, coil 168 opens switch 136 to by-pass the resistor 138 and complete a high current field energizing circuit from battery 120 including leads 122, 130, regulator 132, lead 134, a switch 178, a lead 179 through lead 140 and coil 142 to ground. The increased current across the coil 142 produces a high voltage output from the armature 148 that passes through a plurality of switches 180 closed by the relay coil 176 to complete an alternating current output circuit to supply the power requirements of an AC load 182, for example, the heating element 58 in the embodiment of FIGURE 1. During the high voltage output operation of the generator the coil 172 is energized to open switch 160 whereby the high output voltage from the armature 148 is disconnected from the rectifier circuit 156 and the miscellaneous DC output circuits to prevent their being damaged thereby.

As the case was in the embodiment of FIGURE 3, this circuit arrangement provides a constant voltage supply to the miscellaneous load 126 during low voltage operation and during high voltage operation the field current supply is provided by the battery 120 which also serves during the high voltage operation to supply the load requirements of circuits 126.

In view of the aforesaid remarks, it will be appreciated by those skilled in the art that an automobile power supply system is illustrated that serves to economically effect an alternating high voltage output from a modified generator circuit that is suitable for energizing a heater or other like loads. Such a system is unusually well suited for providing high heat output during a transient warm-up period of a hot water heater system with it being understood that the high voltage output would be suitable for energizing other load requirements in an automobile or other like vehicle for such transient periods.

While the embodiments of the present invention as herein disclosed constitute preferred forms, it is to be understood that other forms might be adopted.

What is claimed is as follows:

1. In an automobile heating system the combination of a primary hot water heating system, an alternator having field coil means and a rectified output, an electrical load including said field coil means, a direct current source, means including a voltage regulator for energizing said field coil means across said direct current source to produce a normal voltage at said alternator output, field coil control means independent of said voltage regulator for varying the energization of said field coil means, said field coil control means including means responsive to the temperature of said water heating system to produce a high voltage output from said alternator when the water heating system is cold, an electrical heater, circuit means for selectively connecting said alternator output to either said electrical load or said electrical heater for preventing concurrent energization of said load and heater, said circuit means including cutoff switch means for automatically disconnecting said alternator output from said electrical load and switch means connecting it to said electrical heater when the water heating system is cold thereby to produce auxiliary heat, said field coil control means and said regulator electrically connecting said field coil means to said direct current source to maintain said field coil means energized when said alternator output is disconnected from said electrical load.

2. In the combination of claim 1, said field coil means including a pair of separate field coil elements, said field coil control means including switch means for connecting said coil elements in series to produce normal alternator voltage output and in parallel to produce said high alternator voltage output.

3. In the combination of claim 1 (said field coil control means for varying field energization including a resistor, and switch means for connecting said resistor in circuit with said field coil means to produce said normal voltage output and for bypassing said resistor to produce said high voltage output.

4. In an automobile electrical system, the combination of a DC source, an AC source including an energizable field coil, a load including said field coil, an electrical heater load and electrical heater, circuit means for selectively connecting the output of said AC source to the load and electrical heater, a voltage regulator connected between said DC source and said field coil for controlling said field coil energization, field coil control means independent of said regulator for producing a first predetermined voltage output from the AC source, said circuit means including means for rectifying the first predetermined voltage output for energizing the load when connected to said AC source, said field coil control means operable to vary the energization of said field coil for producing a second predetermined higher voltage output from said AC source for energizing said electrical heater and means for automatically transferring the load from the AC source to the DC source during operation at said second predetermined voltage output.

5. In an automobile electrical system, an electrical heater, alternator means having a field coil and an output, a load including said field coil, circuit means for selectively electrically connecting the output of said alternator means to said load and said electrical heater, said circuit means including rectifier means and regulator means for controlling the first predetermined voltage output at a constant value for supply to said load, field coil control means independent of said regulator means for producing a first and second higher voltage at said alternator means output, said circuit means further including switch means automatically operable during the operation of said alternator at the second higher voltage output to disconnect said load from said alternator means and to connect said electrical heater to said alternator, a DC source, means for electrically connecting said DC source to said DC load to maintain said field coil energized when said DC load is disconnected from said alternator means output.

(References on following page)

References Cited

UNITED STATES PATENTS

| | | | |
|---|---|---|---|
| 2,158,733 | 5/1939 | Sola | 219—202 X |
| 2,251,370 | 8/1941 | Motzer | 237—12.3 |
| 3,132,228 | 5/1964 | Eisler | 219—202 |
| 3,264,450 | 8/1966 | Wallace | 219—202 X |
| 3,300,619 | 1/1967 | Nilssen | 219—202 X |

ANTHONY BARTIS, Primary Examiner

U.S. Cl. X.R.

165—41; 219—202; 237—12.3; 307—10, 29, 80; 320—64; 322—28